US008752850B2

(12) United States Patent
Ueno et al.

(10) Patent No.: US 8,752,850 B2
(45) Date of Patent: Jun. 17, 2014

(54) ARM COMPONENT FOR VEHICLES AND ITS MANUFACTURING METHOD

(75) Inventors: Masaki Ueno, Kanagawa (JP); Hitoshi Kunihara, Kanagawa (JP)

(73) Assignee: Yorozu Corporation, Kanagawa (JP)

( * ) Notice: Subject to any disclaimer, the term of this patent is extended or adjusted under 35 U.S.C. 154(b) by 0 days.

(21) Appl. No.: 14/004,854

(22) PCT Filed: Mar. 14, 2012

(86) PCT No.: PCT/JP2012/056573
§ 371 (c)(1),
(2), (4) Date: Sep. 12, 2013

(87) PCT Pub. No.: WO2012/124733
PCT Pub. Date: Sep. 20, 2012

(65) Prior Publication Data
US 2014/0008886 A1    Jan. 9, 2014

(30) Foreign Application Priority Data
Mar. 14, 2011   (JP) .................................. 2011-055484

(51) Int. Cl.
*B60G 9/02*       (2006.01)
(52) U.S. Cl.
USPC ................................................. 280/124.121
(58) Field of Classification Search
USPC .................... 280/124.121, 124.125, 124.128, 280/124.134, 124.138, 124.153
See application file for complete search history.

(56) References Cited

U.S. PATENT DOCUMENTS

| 6,511,300 | B2 | 1/2003 | Otsuka |
| 6,663,342 | B2 | 12/2003 | Huang et al. |
| 7,014,420 | B2 | 3/2006 | Chang |
| 8,167,325 | B2 * | 5/2012 | Lee et al. ............... 280/124.134 |
| 8,197,198 | B2 | 6/2012 | Miyabara et al. |
| 2004/0083609 | A1 | 5/2004 | Malott |
| 2009/0277010 | A1 | 11/2009 | Runte et al. |

FOREIGN PATENT DOCUMENTS

JP            1997273535         10/1997
(Continued)

OTHER PUBLICATIONS

International Search Report for PCT/JP2012/056573 mailed Jun. 19, 2012.

*Primary Examiner* — Faye M. Fleming
(74) *Attorney, Agent, or Firm* — Novak Druce Connolly Bove + Quigg LLP

(57) ABSTRACT

Disclosed herein is a suspension arm component for vehicles with sufficient strength or rigidity to withstand repetitive compressive and tensile forces, and a method for manufacturing such a component by pressing or hemming process alone, without recourse to any welding process, forming quickly and simply, a process with advantages in terms of material yield and cost. The suspension arm component for vehicles includes first flange pieces as well as second flange pieces, and a pair of half members, each having a hat-like shaped cross-section perpendicular to its axis, are joined together to protrude the first flange part and the second flange part from an expanded part, where both the first flange part and the second flange part extend linearly along the axis of the main body part. The main body part presents a rectangular shape in its side view.

2 Claims, 6 Drawing Sheets

(56) References Cited

FOREIGN PATENT DOCUMENTS

| JP | 2002-070794 A | 3/2002 |
| JP | 2002316228 A | 10/2002 |
| JP | 2003-056498 A | 2/2003 |
| JP | 2004-156591 A | 6/2004 |
| JP | 2010-007657 A | 1/2010 |
| JP | 2010247757 A | 11/2010 |
| WO | WO-2007147695 A1 | 12/2007 |

* cited by examiner (A)

(B)

US 8,752,850 B2

ARM COMPONENT FOR VEHICLES AND ITS MANUFACTURING METHOD

CROSS-REFERENCE TO RELATED APPLICATIONS

This application is a national stage application (under 35 U.S.C. §371) of PCT/JP2012/056573, filed Mar. 14, 2012, which claims benefit of Japanese Patent Application No. 2011-055484, filed Mar. 14, 2011. Both of the aforementioned applications are incorporated herein by reference.

TECHNICAL FIELD

The present invention relates to an arm component for vehicles and its manufacturing method.

BACKGROUND TECHNOLOGY

Arm components for vehicles, such as suspension arms that connect car bodies with wheels or radius rods that connect sub frames to wheel side structures, need to have sufficient rigidities in order to resist or to transmit large forces that are applied in propelling or braking the vehicles.

An arm component such as those mentioned above is typically constituted of a tube with a specified outer diameter and a wall thickness having a connecting bracket welded on one end and a connecting collar welded on the other end, where the connecting bracket being connected to the wheel side structure and the connecting collar connected to a mounting shaft on the chassis side via a rubber bush inserted the inside thereof. However, such an arm component is undesirable not only because of its heavy weight and also because of its complexity of manufacturing processes as it requires welding as it consists of three parts, a tube, a bracket and a collar.

Of late, a press-formed suspension arm was proposed recently as shown in Patent Document 1. This suspension arm, although it has a large seat for spring in its middle part, having a cross-section perpendicular to its axial direction shaping like a rectangular box with one side of which is open, generally comprises a flat back member extending along its longitudinal direction and a pair of left and right arm half members drooping down from the left and right side of the back member. The suspension arm is press-formed, where each arm half member is simultaneously formed with a through hole at one end thereof to constitute a part to serve as said connection bracket or connection collar, as well as a connection indentation at a position away from said end. Further, the bottom wall of said connection indentations of both arms are welded together in order to connect the right and left half members. The suspension arm thus formed is advantageous in terms of its weight and from the standpoint of manufacturing process since it is press-formed from a single sheet of metal.

PRIOR ART

Patent document

[Patent Document 1] Publication of Unexamined Japanese Patent Application 2002-316228

SUMMARY OF THE PATENT

Problems to be Solved by the Patent

However, this suspension arm requires the bottom walls of the connection indentations to be jointed by welding so that it does not eliminate welding process completely, thus making its manufacture a complicated, time-consuming, and cost-expensive one. Moreover, this suspension arm tends to be susceptive to distortions and deformations and is disadvantageous from the standpoint of strength and rigidity due to the fact that it does not have a closed cross-section but rather that its back member and each arm half member are formed to have a rectangular cross-section with one side being open despite the fact that the connection indentations are welded together. Especially when such a structure having only the right arm half member and the left arm half drooping down from the left and right sides of the back member is subjected to repeated compressive and tensile forces as in the case of a suspension arm, its resistance against compressive forces tends to be weak although it provide some rigidity against tensile forces to a degree.

The present invention is intended to solve the problem associated with the above-mentioned prior art by providing an improved arm component and a method of manufacturing thereof, wherein the improved arm component not involving any welding process to produce, and providing a method of forming more quickly and simply by means of press-forming and hemming processes, with a better material yield and more cost-effectiveness, and providing sufficient strength and rigidity against repetitive compressive and tensile forces.

Means of Solving the Problem

An aspect of the present invention to achieve the purpose mentioned above is an arm component for vehicles whose longish main body part having connecting parts with a communicating hole formed at each end of said connecting parts includes a pair of half members with a hat-like shaped cross-section perpendicular to an axis comprising: a curved protrusion part extending along an axial direction; and a first flange piece and a second flange piece formed to extend from a foothill of said curved protrusion part, wherein as a result of putting said two flange pieces together, a first flange part consisting of each first flange piece and second flange part consisting of each second flange piece of their respective half member protruding from an expanded part consisting of said curved protrusion part, characterized in that said first flange part is formed by a bending process in such a way as to cause the first flange piece of one of the half members to form a structure that integrally continues to the first flange piece of other of the half members, distal ends of said second flange parts being formed by a bending process in such a way as to cause an edge of the second flange piece of one of the half members is overwrapped by the second flange piece of the other half member, and both said first flange part and second flange part being formed to extend linearly along the axis of said expanded part as well as to cause said main body part to present a rectangular shape in its side view.

Another aspect of the present invention to achieve the purpose mentioned above is a method of manufacturing an arm component for vehicles whose longish main body part having connecting parts with a communicating hole formed at each end of said connecting parts includes a pair of half members with a hat-like shaped cross-section perpendicular to an axis comprising: a curved protrusion part extending along an axial direction; and a first flange piece and a second flange piece formed to extend from a foothill of said curved protrusion part, wherein as a result of putting said two flange pieces together, a first flange part consisting of each first flange piece and second flange part consisting of each second flange piece of their respective half member protruding from an expanded part consisting of said curved protrusion part, in particular, such a method of manufacturing the arm component for vehicles characterized in comprising: a process of punching out a relatively longish blank material for forming said main body part and connecting parts; a process of forming a middle expanded part, said middle expanded part formed in such a manner as to extend in the middle of said blank material along the axial direction with its top surface serving as a first flat surface, and a first upright piece being formed on the outside of said first flat surface; a first bending process for forming a second upright piece at a position apart from said middle expanded part in the width direction, and a second flat surface that extends outward flatly from the top edge of said second upright piece; a second bending process for forming a folding piece by bending the outer part of one of said second flat surfaces; a third bending process of causing the half members, each having a hat-like shaped cross-section consisting of said first flange piece, said curved protrusion part having said first upright piece and second upright piece, and a second flange pieces consisting of said second flat surfaces, to face with each other; and a fourth bending process to bend said folding piece in order to overwrap the edge of said second flange piece of the other half member.

Effect of the Invention

According to the present invention, a product can be quickly and simply formed and the formed product will have a better appearance and an improved quality as it does not rely on any welding process but relies only on bending processes. Since the particular product is made by forming a first flange part and a second flange part on a expanded part of a closed cross-section structure by extending them linearly along the axis of a main body part, it provides a sufficient strength even when it is exposed to repetitive compressive and tensile forces.

The product shows a sufficient strength or rigidity against repetitive compressive and tensile forces as said main part is formed to have a rectangular shape in the side view and the flange parts serve as reinforcement members.

Furthermore, there is an additional advantage in this design that a variety of arm components can be manufactured by providing a communicating hole in each end of both half members in forming a connecting part on both ends of the axial direction of the main part, inserting a collar in said communicating hole, and appropriately modifying the inner diameter of the communicating hole in each application.

The main body part should preferably be constituted in such a way as to have an arc-shaped outer edge part formed in such a way that a curved protrusion part changes its width gradually from wider in the vicinity of the connecting part and narrower in the middle. This makes it possible for the arm component to have a uniform strength over its entirety and can be safely used for applications where tensile and compressive forces occur repetitively.

Moreover, since both flange parts are formed utilizing, so to speak, excess thickness, reducing the removed portions to provide a better material yield, thus making it beneficial from the cost standpoint as well. In other words, the first and second flange parts exist extending from the curved protrusion part formed wider in the vicinity of the connecting part and narrower in the middle, and the entire main body part is formed in a rectangular shape as it is viewed from a side, so that the flange parts that are continuing from the curved protrusion part of the curved protrusion part that is formed narrower function as reinforcement members with ample thickness, so that the component provides a sufficient strength or rigidity against compressive and tensile forces repetitively applied.

The main body part and the connecting part should preferably made of a sheet of high tensile strength steel. This makes the entire arm component for vehicles light and strong.

According to the manufacturing method of the arm component of the present invention, it is formed by a bending process without the need of a welding process, so that it becomes advantageous from the cost standpoint.

Moreover, in case of forming a first flange part that protrudes from the expanded part for a reinforcement purpose, it is formed by bending along the axial line a central expanded part formed by draw-forming a pre-blanked material, so that it is possible to form quickly and simply a strong first flange part extending in a straight line along the axial line. As to the second flange part, it is also possible to form quickly and simply a strong part extending in a straight line by bending an upright piece formed on the outside of one of the second flange pieces to overwrap the edge of the other second flange piece.

Another object, features and characteristics of the present invention shall become apparent by referring to a preferable embodiment exemplified in the following descriptions and accompanying drawings.

BRIEF DESCRIPTION OF THE DRAWINGS

FIG. 7(A) is a perspective view showing a central expanded part formed on said blank, while FIG. 7(B) is a cross-sectional view of said blank perpendicular to its axis.

FIG. 8(A) is a perspective view of a status of said blank after a first bending process, while FIG. 8(B) is a cross-sectional view of said blank perpendicular to its axis.

FIG. 10(A) is a perspective view of a status of said blank after a pierce-burring process and a second bending process, while FIG. 10(B) is a cross-sectional view of said blank perpendicular to its axis.

FIG. 11(A) is a perspective view of a status of said blank after a third bending process applied to the central expanded part, while FIG. 11(B) is a cross-sectional view of said blank perpendicular to its axis.

FIG. 12(A) is a perspective view of a status of said blank after a fourth bending process, while FIG. 12(B) is a cross-sectional view of said blank perpendicular to its axis.

MODE FOR CARRYING OUT THE INVENTION

An embodiment of the present invention is described below.

Figure 1:
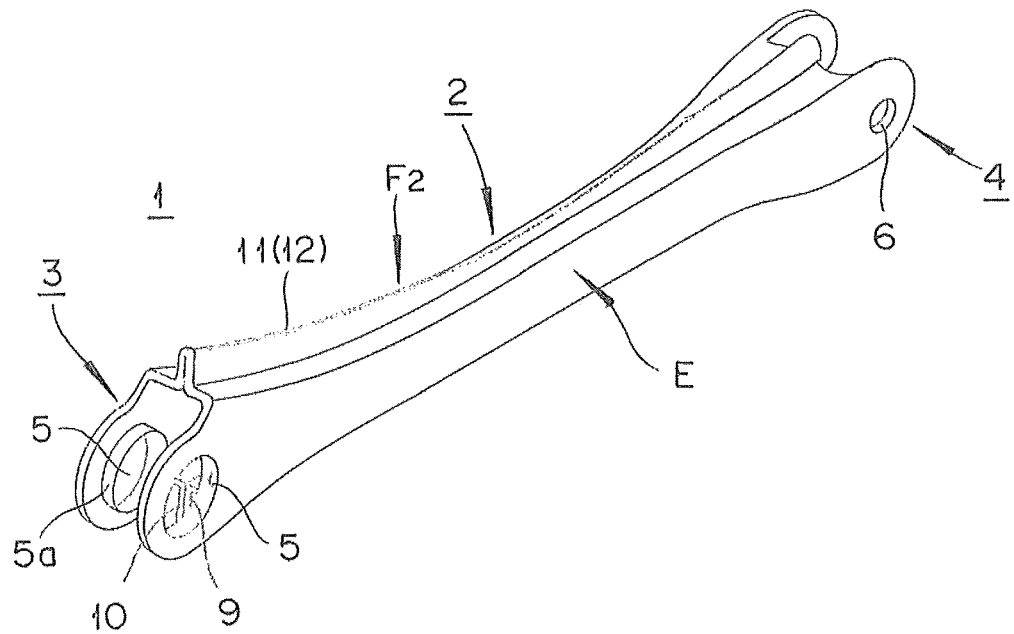
FIG. 1 is a general perspective view of a suspension arm according to an embodiment of the present invention.

As shown in FIG. 1, the arm component for vehicles according to the present invention is intended to be used for a suspension arm 1 for vehicles, comprising: a longish main body part 2, connecting parts 3 and 4 provided on both ends of the main body part 2. The connecting part 3 is formed with a communicating hole 5 of a large diameter, into which a bush is pressed in, in order to connect with a shaft member (not shown) that is protruding from the body side via an elastic member such as rubber, and the connecting part 4 is formed with communicating hole 6, into which a bolt (not shown) is inserted from the wheel side to allow them to be connected by a nut.

Figure 2:
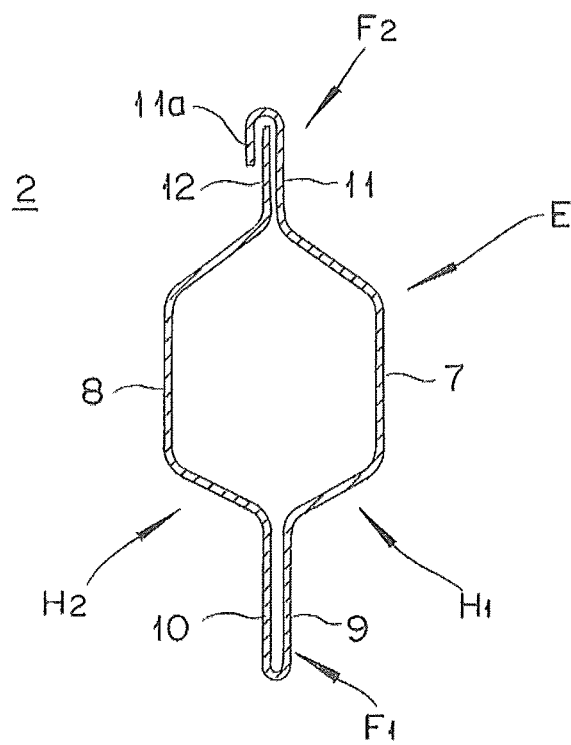
FIG. 2 is a cross-sectional view perpendicular to the axis of said suspension arm.

As shown in FIG. 2, the expanded part E of the main body part 2 comprises: curved protrusion parts 7 and 8 that extend along the axial direction and protrude outward simultaneously; and a pair of half members H1 and H2 whose cross-sections perpendicular to the axis have hat-like shapes having first flange pieces 9 and 10 and second flange pieces 11 and 12 extending from the foothills of the curved protrusion part 7 and 8 respectively, wherein the first flange part F1 consisting of the first flange pieces 9 and 10 and the second flange part F2 consisting of the second flange pieces 11 and 12 are protruding vertically are protruding from the expanded part E.

Figure 3:
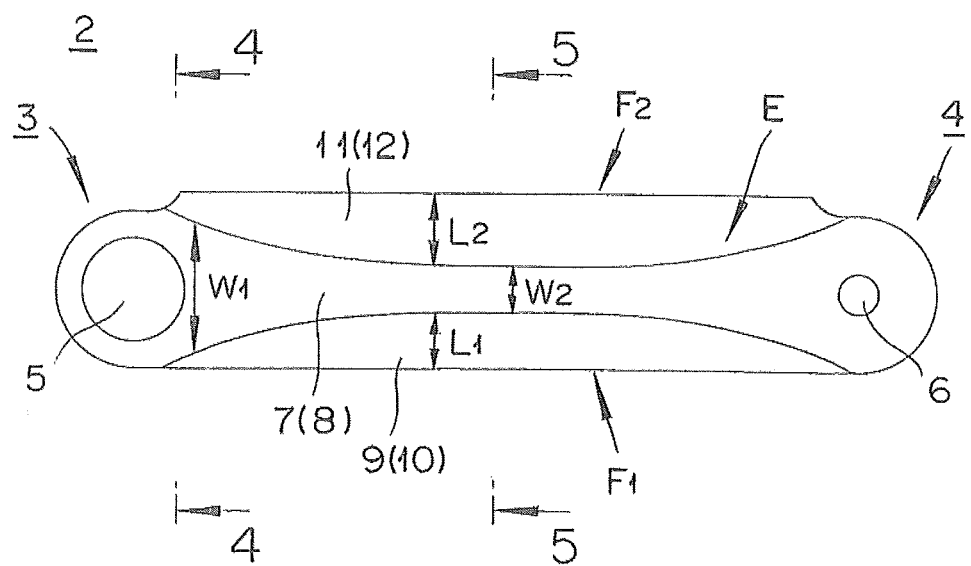
FIG. 3 is a general cross-sectional view of said suspension arm.
Figure 4:
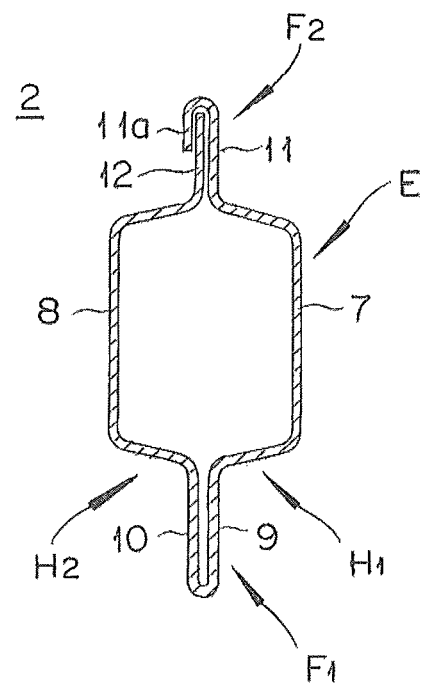
FIG. 4 is a cross-sectional view along the line 4-4 shown in FIG. 3.
Figure 5:
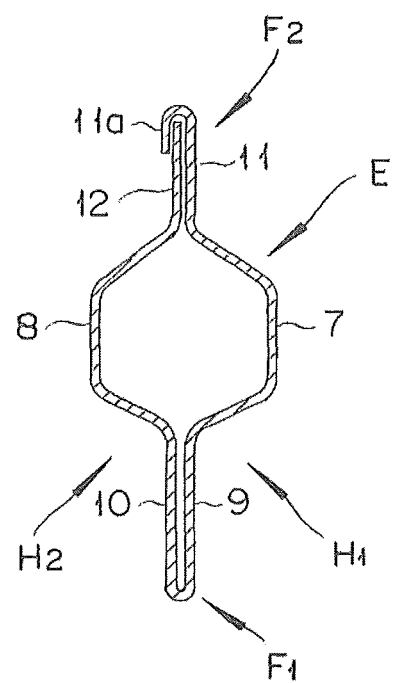
FIG. 5 is a cross-sectional view along the line 5-5 shown in FIG. 3.

The expanded part E is formed, as shown in FIG. 3, to have a wider width W1 in the area close to the connecting part 3 or 4, while a narrower width W2 in the middle area. In other words, as shown in FIGS. 3-5, the expanded part E is formed as an arc-shaped outer edge part that gradually changes its width W (collective name for W1 and W2) from narrower in the middle to wider in the areas close to both ends. This is intended to provide a uniform strength over the entire range and to avoid an increase of its weight having a larger width W at the same time.

The first flange piece 9 of one of the half members H1 is constituted to connect continuously to the first flange piece 10 of the other half member H2, so that the first flange pieces 9 and 10 develop a substantially close contact with each other by means of bending. Also, the second flange piece 11 of one of the half members H1 is formed by bending to overwrap the second flange piece 12 of the other half member H2 from its top edge.

In particular, in the present embodiment, the first flange part F1 and the second flange part F2 are both formed to extend straight along the axis of the main body part 2, and the main body part 2 comprising the expanded part E, the first flange part F1, and the second flange part F2 is formed to show a rectangular shape when viewed from a direction perpendicular to the axis (this is the state shown in FIG. 3 and will be called simply as "side view" hereinafter)

Forming the first flange part F1 and the second flange part F2 to extend in straight lines along the axis of the main body part 2 not only improves the strength to resist the force acting on both connecting parts 3 and 4, but also makes it easy to execute the press forming or the hem forming, thus making it more advantageous from the cost standpoint.

Also, by forming the main body part 2 in a rectangular shape as shown in FIG. 3, it is possible to provide large distances L1 and L2 from the arc-shaped outer edge part of the expanded part E, the width W of which is narrower in the middle but wider at both ends, to the edges of the first flange part F1 and the second flange part F2 respectively. Consequently, the flange parts F1 and F2 extending from the narrow width expanded part E are able to function as reinforcement members with amble thickness, so that they able to provide sufficient strengths and rigidities to withstand repetitive compressive and tensile forces. Moreover, both flange parts F1 and F2, which were to be considered as excess thickness, are now capable to function as reinforcement members without having to be cut off, so that it amounts to a reduction of parts to be removed, thus making it more advantageous from the standpoints of material yield and production cost.

The method of producing the arm component for vehicles of such a constitution is described in the following.

<Punching Process>

Figure 6:
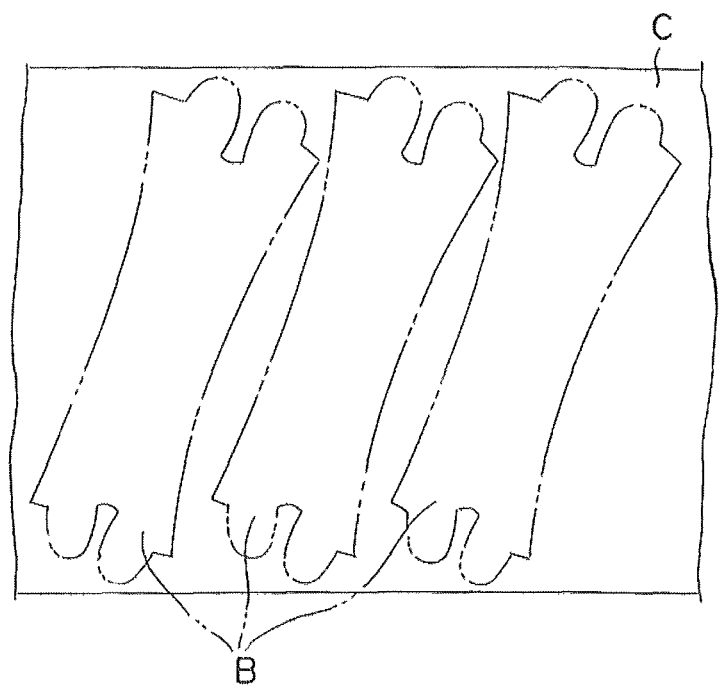
FIG. 6 is a plan view showing a status of punching out a blank used for forming said suspension arm.

First, as shown in FIG. 6, a blank material B of a relatively longish specific shape that corresponds to a developed shape of an arm component for vehicles comprising the main body part 2 and the connecting parts 3 and 4 is punched out and formed. The punching process is done by pulling out a sheet metal C originally rolled in a coil shape and punching out into the specific shape using a press die. The sheet metal C does not have to be of any specific kind except that it is preferable to be a high tensile strength steel of sufficient strength and light weight.

<Middle Expanded Part Forming Process>

Figure 7:
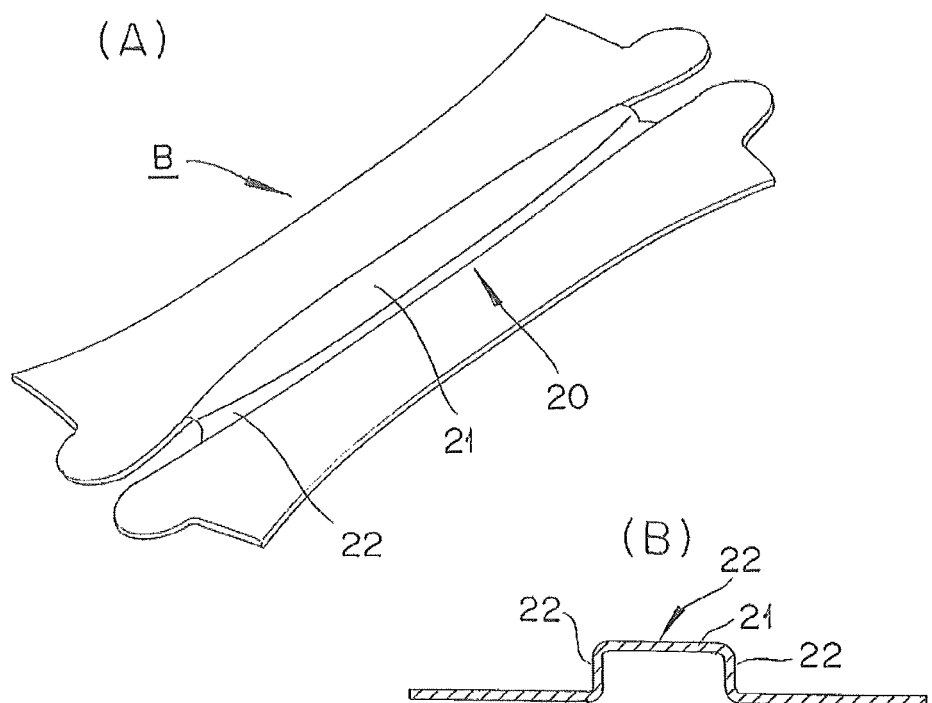

Next, the middle expanded part 20 is formed applying a draw forming process to the punched out blank B. As shown in FIG. 7(A), the middle expanded part 20 is formed in the middle of the width direction of the blank material B to extend along the axis direction, where the top surface is made a flat surface 21, and a first upright piece 22 is formed on the outside of the first flat surface 21. The first upright piece 22 is formed on the outer edge of the middle expanded part 20 presents a smooth arc-like shape.

As a result of this forming, the blank B comes to present a state of having flat parts on both sides of the middle expanded part 20 expending upward as shown in FIG. 7(B).

<First Bending Process>

Figure 8:
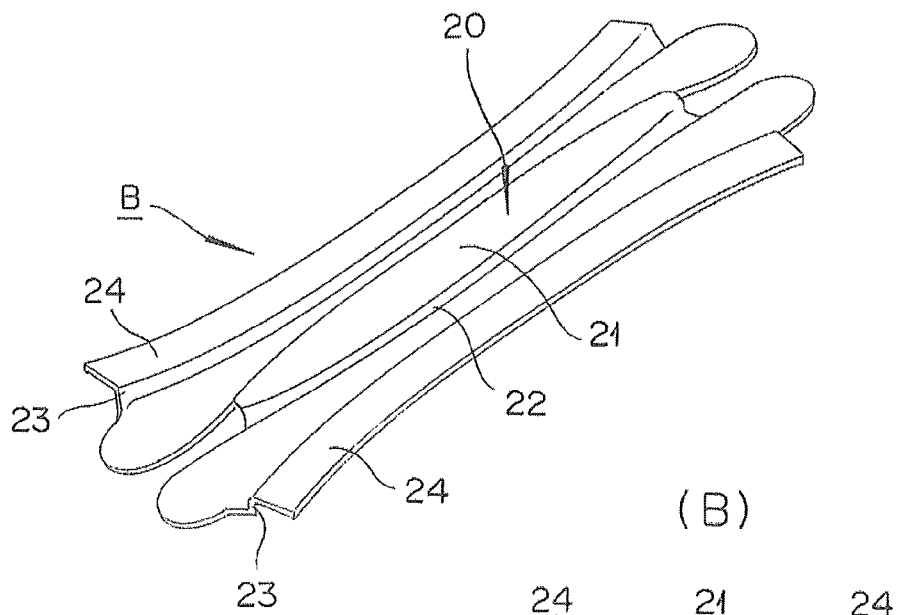

A first bending process is applied at this point to the blank material B to cause it to rise at positions apart in the width direction from the middle expanded part 20 as shown in FIG. 8(A). While this process forms second upright pieces 23, second flat surfaces 24 are formed to extend horizontally from the top edge of the second upright pieces 23.

In this first bending process, the blank material B is formed on the parts on both sides of the middle expanded part 20 to correspond with the expanded part B as shown in FIG. 8(B), creating the second flat parts 24 that are to be formed later as the second flange part F2.

<Piercing Process>

Figure 9:
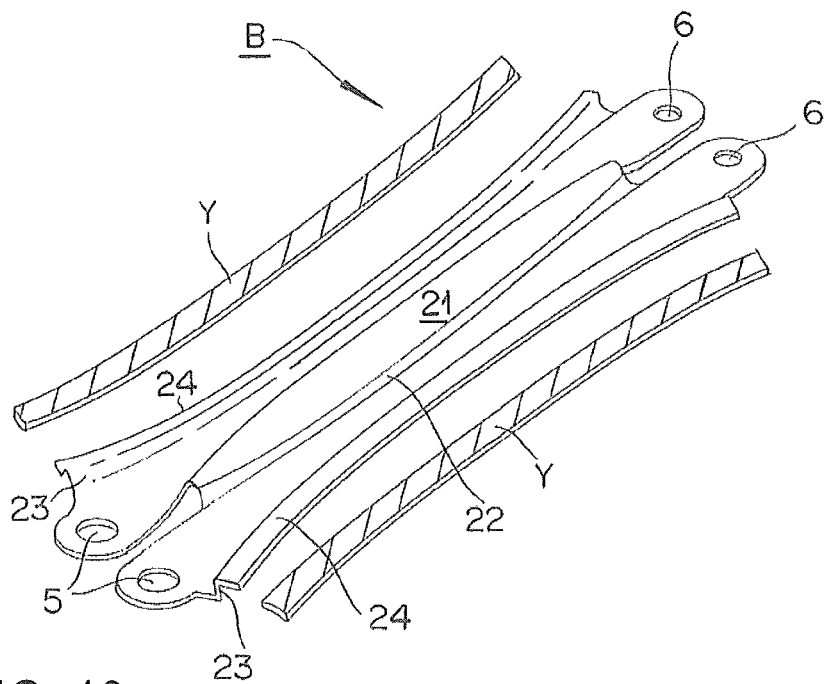
FIG. 9 is a perspective view of a status of said blank after a through hole and others are formed.

At this point, communicating holes 5 with a larger diameter and communicating holes 6 with a smaller diameter are pierced on the blank material B as shown in FIG. 9. It is preferable to form a protrusive edge 5*a* on the internal edge of the communicating hole 5 in this process. Since the communicating hole 5 is an area to which a collar or a bush is to be pressed in to be permanently fixed, the formation of protruding edge 5*a* is preferable as it increases a region to support the collar and the like to support them more rigidly. If unnecessary parts develop later as a result of mode change or design alteration, the excess part Y can be removed simultaneously.

<Second Bending Process>

Figure 10:
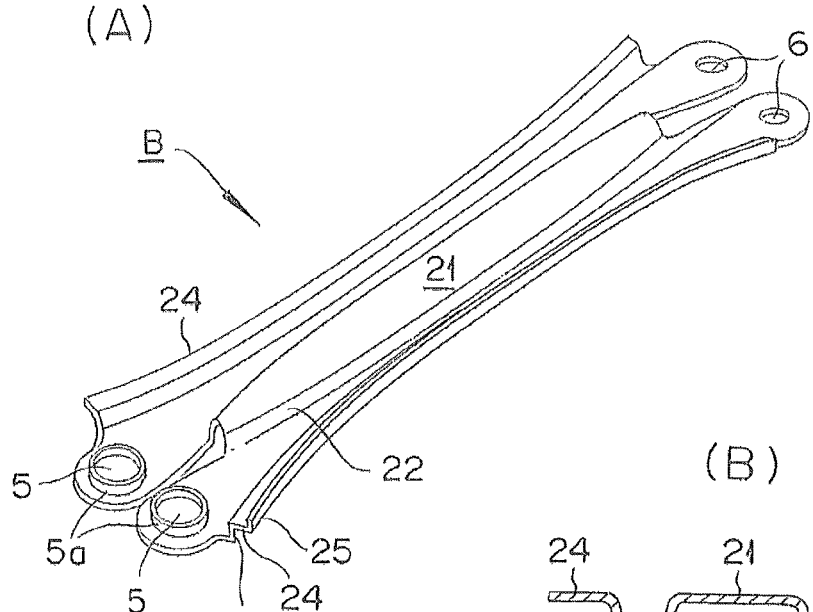
Figure 10:
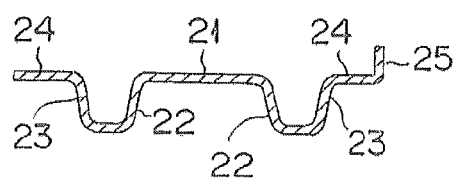

Next, the external part of one of the second flat surfaces 24 is bent to form a folding piece 25 as shown in FIGS. 10(A) and (B). The folding piece 25 is provided to overwrap the second flange piece 12.

<Third Bending Process>

By bending the middle part of the middle expanded part 20 along the axis as shown in FIG. 11(A), the half members H1 and H2 come to face with each other. As a result, each of the half members H1 and H2 comes to show a substantially hat-like shape in their cross-sections perpendicular to the axis, where the first upright piece 22 and the second upright piece 23 (corresponding to a portion of the expanded part E) are uprising between the first flat surface 21 (correspond to the first flange pieces 9 and 10) and the second flat surface 24 (corresponding to the second flange pieces 11 and 12).

Figure 11:
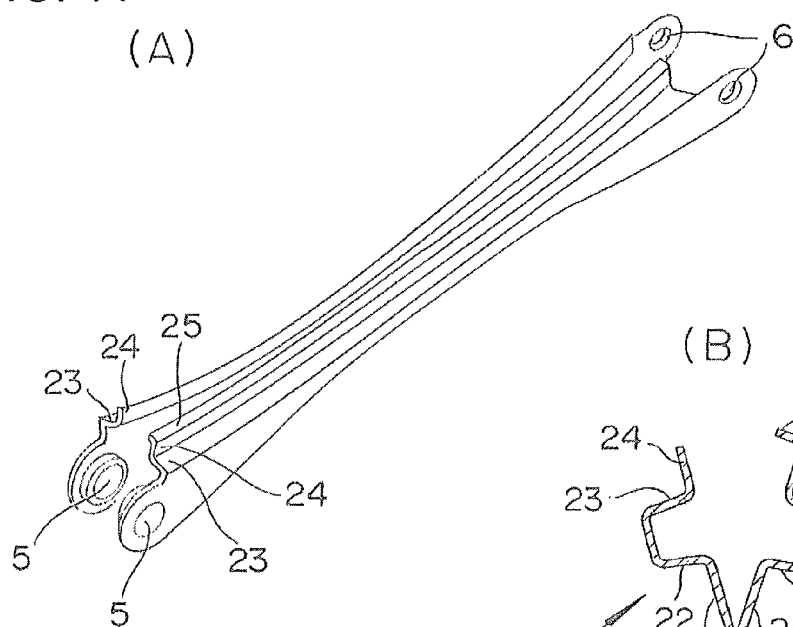
Figure 11:
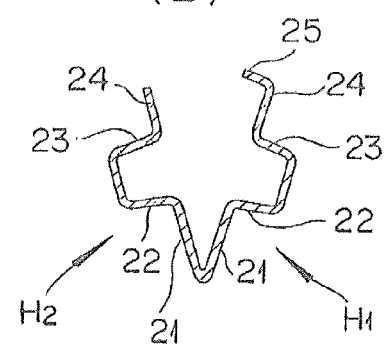

This third bending process causes, as shown in FIG. 11 (B), parts that continue to the first flange pieces 9 and 10 respectively are formed at the bottom parts of the half member H1 and H2 to be integral parts thereof, making the parts that correspond to the second flange part F2 come close to each other at the upper parts.

<Fourth Bending Process>

Figure 12:
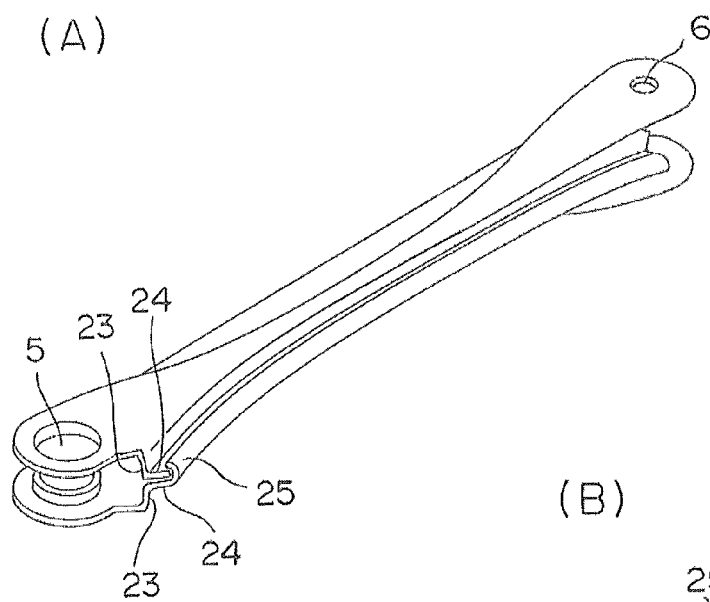
Figure 12:
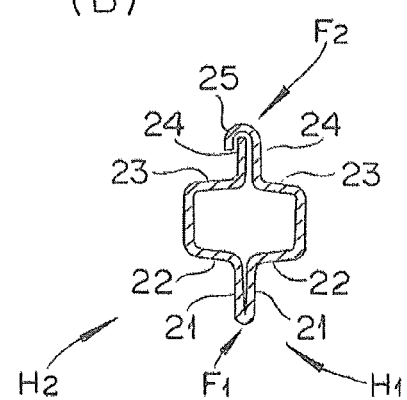

Lastly, it is bent as shown in FIGS. 12(A) and (B) so that the folding piece 25 of one of the second flat surfaces 24 overwraps the edge of the other second flat surface 24. This process forms the second flange part F2 consisting of both second flat surfaces 24 of both half members H1 and H2 closely contacting with each other as well as the first flange part F1 formed at the bottom edge. This bending process is not only limited to hemming but also can be implemented by swaging.

As can be seen from the above, the method of the present invention is accomplished by means of bending without recourse to any welding, so that it is more preferable from the standpoint that it does not cause any excess material buildup as is common with a welding process, resulting in a product of a superior quality, and the connection of the parts can be accomplished within an extremely short period of time compared to a case of relying on welding.

The present invention should not be construed to be limited to the embodiment described above but can be modified arbitrarily within the gist of the technology disclosed by the present invention. For example, although the above embodiment is described about a suspension arm, the present invention is not limited to it but rather it is applicable to longish arm-like components for vehicles such as clutch pedal arms, radius rods, trailing arms, etc.

Moreover, although the cross-sections of the half members H1 and H2 are formed like hats, but it is also possible to form only one of them like a hat and leave the other as a flat piece. Furthermore, although the first and second flange parts F1 and F2 are flat and extend linearly in the axial direction, it is also possible to have spot-like or linear undulations formed on the flange parts. Such a structure may contribute to a further reinforcement of the strength of the arm component for vehicles.

INDUSTRIAL APPLICABILITY

The present invention is suitably applicable to the manufacture of such components as suspension arms for vehicles to achieve products of light-weight and better appearance.

The present invention claims priority to the Japan Patent Application No. 2011-055484 applied on Mar. 14, 2011, the entire contents of which are incorporated by reference herein.

EXPLANATION OF LETTERS OR NUMERALS

1: pedal arm for vehicles
2: main body part
3, 4: connecting part
5: communicating hole of a large diameter
6: communicating hole of a small diameter
7, 8: curved protrusion part
9, 10: first flange piece
11, 12: second flange piece
20: middle expanded part
21: first flat surface
22: first upright piece
23: second upright piece
24: second flat surface
25: folding piece
B: blank member
F1: first flange piece
F2: second flange piece
H1, H2: half member
W: width of expanded part

The invention claimed is:

1. A suspension arm component for vehicles with a longish main body part having connecting parts with a communicating hole formed at each end of said connecting parts includes a pair of half members with a hat-like shaped cross-section perpendicular to an axis, comprising:
   a curved protrusion part extending along an axial direction; and
   a first flange piece and a second flange piece formed to extend from a foothill of said curved protrusion part, wherein
   as a result of putting said two flange pieces together, a first flange part consisting of each first flange piece and second flange part consisting of each second flange piece of their respective half member protruding from an expanded part consisting of said curved protrusion part, characterized in that
   said first flange part is formed by a bending process applied in the middle of its width direction after at least a pair of said communicating holes is provided at positions that are symmetric to each other relative to its axial direction in such a way as to cause the first flange piece of one of the half members to form a structure that integrally continues to the first flange piece of other of the half members, distal ends of said second flange parts being formed by a bending process in such a way as to cause an edge of the second flange piece of one of the half members is overwrapped by the second flange piece of the other half member, and both said first flange part and second flange part being formed to extend linearly along the axis of said expanded part as well as to cause said main body part to present a rectangular shape in its side view, wherein said main body part is constituted to have an arc-shaped outer edge part formed in such a way that a width of said curved protrusion part varies gradually to be wider in vicinities of said connecting parts but narrower in middle of said curved protrusion.

2. The suspension arm component for vehicles as claimed in claim 1, wherein said main body part and connecting part are made of a sheet of high tensile strength steel.

* * * * *